US012639326B2

(12) United States Patent
Fang et al.

(10) Patent No.: US 12,639,326 B2
(45) Date of Patent: May 26, 2026

(54) DATABASE MANAGEMENT STORAGE CONFIGURATION ADVISOR IN CLOUD COMPUTING ENVIRONMENT

(71) Applicant: SAP SE, Walldorf (DE)

(72) Inventors: Yuan Fang, Shanghai (CN); Zheng-wei She, Shanghai (CN); Hui Feng, Shanghai (CN); Haipei Liu, Shanghai (CN); Xu-dong Qian, Shanghai (CN); Ruediger Karl, Waibstadt (DE)

(73) Assignee: SAP SE, Walldorf (DE)

( * ) Notice: Subject to any disclaimer, the term of this patent is extended or adjusted under 35 U.S.C. 154(b) by 4 days.

(21) Appl. No.: 18/669,838

(22) Filed: May 21, 2024

(65) Prior Publication Data

US 2025/0363126 A1 Nov. 27, 2025

(51) Int. Cl.
*G06F 16/25* (2019.01)

(52) U.S. Cl.
CPC .................................... *G06F 16/25* (2019.01)

(58) Field of Classification Search
CPC ........................................................ G06F 16/25
See application file for complete search history.

(56) References Cited

U.S. PATENT DOCUMENTS

| | | | | |
|---|---|---|---|---|
| 12,184,415 | B2 * | 12/2024 | Rosnov ................. | H04W 4/027 |
| 2009/0319519 | A1 * | 12/2009 | Sakakihara ......... | G06F 16/1834 |
| | | | | 707/999.005 |

| | | | | |
|---|---|---|---|---|
| 2018/0074723 | A1 * | 3/2018 | Delaney ................. | G06F 3/067 |
| 2018/0373722 | A1 * | 12/2018 | Ulasen ................... | G06N 3/045 |
| 2020/0057766 | A1 * | 2/2020 | Hawton ................ | G06F 16/217 |
| 2020/0142618 | A1 * | 5/2020 | Zhan .................... | G06F 13/4022 |
| 2020/0387486 | A1 * | 12/2020 | Shrivastava .......... | G06F 3/0604 |
| 2021/0133026 | A1 * | 5/2021 | Horn .................... | G06F 11/1076 |
| 2021/0266379 | A1 * | 8/2021 | D'Acunto ............... | H04L 67/63 |
| 2021/0311949 | A1 * | 10/2021 | Basak ................. | G06F 16/2282 |
| 2022/0138168 | A1 * | 5/2022 | Veselova ........... | G06F 16/24532 |
| | | | | 707/692 |
| 2023/0004539 | A1 * | 1/2023 | Cushman, II ......... | G06F 16/252 |
| 2023/0306027 | A1 * | 9/2023 | Sun ..................... | G06F 16/2272 |

* cited by examiner

*Primary Examiner* — Allen S Lin
(74) *Attorney, Agent, or Firm* — Buckley, Maschoff & Talwalkar LLC

(57) ABSTRACT

Embodiments may include a collected statistics data store that contains statistics about information accessed via an in-memory database management system that is executing in a cloud computing environment. A configuration advisor executing in the cloud computing environment may retrieve the statistics about information accessed via the in-memory database management system. Based on the retrieved statistics, the configuration advisor may automatically generate a data storage recommendation for the in-memory database management system. The data storage recommendation may be, for example, associated with page-loadable or column-loadable units and a persistence memory layer. According to some embodiments, the data storage recommendation may be further based on a storage cost, a performance metric, an access frequency, an object threshold (e.g., a threshold for a data column, a data partition, or a data table), recommendation rule-based heuristics, etc.

19 Claims, 16 Drawing Sheets

900

APPLY NSE RECOMMENDATIONS

The memory consumption could be decreased by changing the load unit of tables, partitions, or columns. The current setting are not optimized for the resource usage.

Recommended Action:
Select related objects that you want to change their load unit from COLUMN to PAGE.

Search 910

920
Apply

| Schema | Table | Partition | Column | Physical Size | Effective Unit | Status |
|--------|-------|-----------|--------|---------------|----------------|--------|
| SCHEM1 | tenant | monies | impedit | 2.910 MB | COLUMN | New |
| SCHEM1 | anuimi | non | ease | 5.975 MB | COLUMN | New |
| SCHEM2 | corrrupt | dolore | delect | 14,311 MB | COLUMN | New |

| DATABASE MANAGEMENT SYSTEM IDENTIFIER 1402 | CONFIGURATION PARAMETERS 1404 | RECOMMENDATION DETAILS 1406 | RECOMMENDATION 1408 |
|---|---|---|---|
| DBMS_101 | COLLECT STATISTICS FOR 30 MINUTES | MEDIUM SEVERITY; COST CATEGORY | CHANGE LOAD UNIT TO PAGE |
| DBMS_102 | 100 ROW MINIMUM COUNT FOR OBJECTS | OPTIMIZED | NO CHANGE |
| DBMS_103 | 40% OF OBJECTS "HOT" | MEDIUM SEVERITY; PERFORMANCE CATEGORY | CHANGE LOAD UNIT TO COLUMN |
| DBMS_104 | 30% OF OBJECTS "COLD" | LOW SEVERITY; PERFORMANCE CATEGORY | NO CHANGE |

DATABASE MANAGEMENT STORAGE CONFIGURATION ADVISOR IN CLOUD COMPUTING ENVIRONMENT

BACKGROUND

An in-memory database management system may store information "in-memory" and/or on a persistence storage layer, such as a disk. Although in-memory storage may allow for faster processing, it can be more costly as compared to storing information on a disk. As a result, there is a trade-off between Total Cost of Operation ("TCO") and performance. That is, information that is relatively rarely accessed might be more advantageously stored on disk instead of in-memory. Manually analyzing workloads and access patterns to strike a configuration having the correct balance, however, can be a challenging and time-consuming task. To help developers design such a system, a storage configuration adviser may automatically generate recommendations for a developer. Note that when an in-memory database management system is implemented via a cloud-computing environment, implementing such a storage configuration advisor can pose a number of problems. As a result, systems are desired to help efficiently improve the performance and cost of various types of data storage and data operations in a cloud environment.

SUMMARY

According to some embodiments, methods and systems may include a collected statistics data store that contains statistics about information accessed via an in-memory database management system that is executing in a cloud computing environment. A configuration advisor executing in the cloud computing environment may retrieve the statistics about information accessed via the in-memory database management system. Based on the retrieved statistics, the configuration advisor may automatically generate a data storage recommendation for the in-memory database management system. The data storage recommendation may be, for example, associated with page-loadable or column-loadable units and a persistence memory layer. According to some embodiments, the data storage recommendation may be further based on a storage cost, a performance metric, an access frequency, an object threshold (e.g., a threshold for a data column, a data partition, or a data table), recommendation rule-based heuristics, etc.

Some embodiments comprise: means for retrieving, from a collected statistics data store, statistics about information accessed via an in-memory database management system executing in a cloud computing environment; based on the retrieved statistics, means for automatically generating, by a computer processor of a configuration advisor executing in the cloud computing environment, a data storage recommendation for the in-memory database management system, the data storage recommendation being associated with page-loadable or column-loadable units and a persistence memory layer.

Some technical advantages of some embodiments disclosed herein are improved systems and methods to help efficiently improve the performance and cost of various types of data storage and data operations in a cloud environment.

BRIEF DESCRIPTION OF THE DRAWINGS

FIG. 9 is an NSE configuration review interface according to some embodiments.

FIG. 14 is a portion of a tabular result storage according to some embodiments.

DETAILED DESCRIPTION

Briefly, some embodiments may help efficiently improve the performance and cost of various types of data storage and data operations in a cloud environment. In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
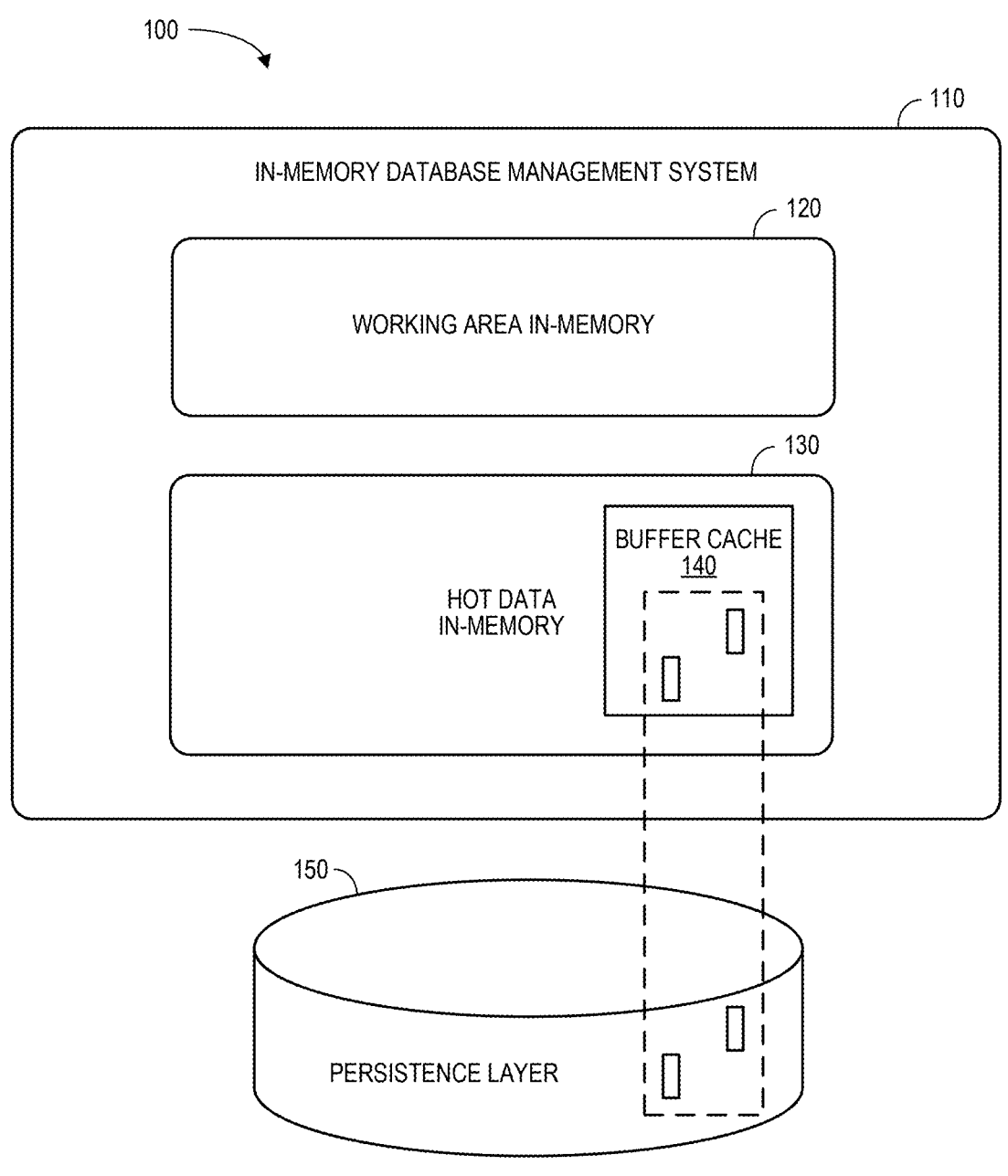
FIG. 1 is a system with an in-memory database management system.

An in-memory database management system may store information "in-memory" and/or on a persistence storage layer, such as a disk. For example, SAP™ HANA® is one such in-memory database management system. Although in-memory storage may allow for faster processing, it can be more costly as compared to storing information on a disk. As a result, there is a trade-off between TCO and a storage configuration adviser may automatically generate recommendations for a developer. For example, the Native Storage Extension ("NSE") advisor is a tool to help configure NSE load units (page-loadable or column-loadable) for HANA® database storage situation. With the NSE advisor, customers don't need to manually configure NSE load unit per table, partition, or columns by understanding the workload and access patterns. FIG. 1 is a system 100 with an in-memory database management system 110 which includes both working area in-memory 120 and hot data in-memory 130. The NSE advisor lets a customer manage less-frequently accessed data without fully loading it into memory. In some cases, NSE may integrate flash-drive based database technology with the HANA® in-memory database for an improved price-to-performance ratio (e.g., achieving substantial licensing cost savings). The hot data in memory 130 may be used to store mission-critical data for real-time processing and analytics and is retained continuously in memory for fast performance and is also stored in a persistence layer 150.

On the other hand, "warm" data may be primarily used to store mostly read-only data that does not need to be accessed frequently. This is still managed as a unified part of the database, transactionally consistent with hot data, and participates in backup and system replication operations. While hot data is "column-loadable," residing in-memory for fast processing and loaded from disk into HANA® memory in columns, certain warm data can be specified as "page-loadable." This data is loaded into memory page-by-page as required for query processing. Unlike column-loadable data, page-loadable data does not need to reside completely in memory. The database is partly in memory and partly on disk, as illustrated buffer cache 140 in FIG. 1, which can substantially increase data capacity and reduce TCO for customers. Note that NSE may be integrated with other functional layers, such as a query optimizer, a query execution engine, a column store, persistence layers, etc.

Figure 2:
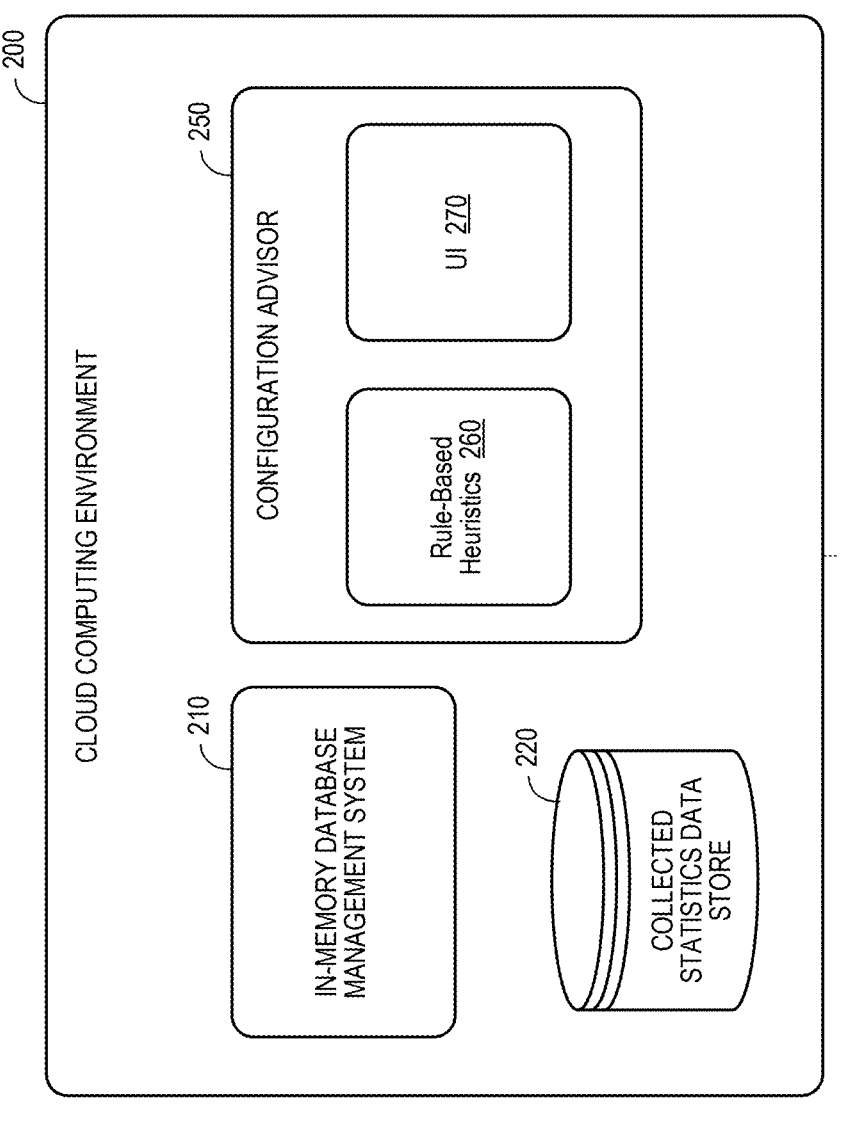
FIG. 2 is a high-level block diagram of a cloud computing environment system in accordance with some embodiments.

FIG. 2 is a high-level block diagram of a cloud computing environment system 200 in accordance with some embodiments. The system 200 includes an in-memory database management system 210, a collected data statistics data store 220, and a configuration advisor 250. Moreover, the configuration advisor 250 implements rule-based heuristics 260 and a User Interface ("UI") 270 to generate storage recommendation. According to some embodiments, devices, including those associated with the system 200 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 200 may store data into and/or retrieve data from various data stores (e.g., the collected statistics data store 220), which may be locally stored or reside remote from the configuration advisor 250. Although a single configuration advisor 250 is shown in FIG. 2, any number of such devices may be included. Moreover, various devices described herein might be combined according to embodiments of the present invention. For example, in some embodiments, the configuration advisor 250 and the collected statistics data store 220 might comprise a single component or apparatus. Some or all of the system 200 functions may be performed by a constellation of networked apparatuses, such as in a distributed processing or cloud-based architecture.

An operator (e.g., a database administrator) may access the system 200 via a remote device (e.g., a Personal Computer ("PC"), tablet, or smartphone) to view data about and/or manage operational data in accordance with any of the embodiments described herein. In some cases, the UI 270 may let an operator or administrator define and/or adjust certain parameters (e.g., to set up or adjust various buffer cache sizes or recommendation rules) and/or provide or receive automatically generated recommendations, results, and/or alerts from the system 200.

Figure 3:
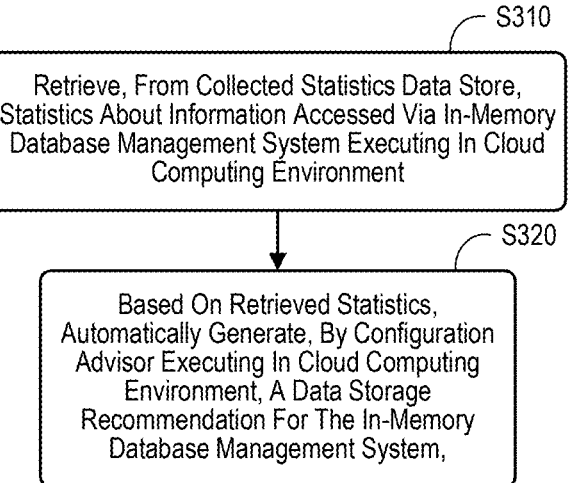
FIG. 3 is a configuration advisor method according to some embodiments.

FIG. 3 is a configuration advisor method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S310, a configuration advisor may retrieve, from a collected statistics data store, statistics about information accessed via an in-memory database management system executing in a cloud computing environment. Based on the retrieved statistics, at S320 a computer processor of the configuration advisor executing in the cloud computing environment may automatically generate a data storage recommendation for the in-memory database management system. The data storage recommendation may be, for example, associated with page-loadable or column-loadable units and a persistence memory layer. For example, the data storage recommendation might be based on a storage cost and a performance metric. Note that the recommendation may further be based on an access frequency, an object threshold, recommendation rule-based heuristics, etc.

According to some embodiments, the object threshold is associated with a data column, a data partition, or a data table. Moreover, the configuration advisor may include a UI that lets a user convert between column-loadable and page-loadable options on an object-by-object basis. The UI may, for example, include a recommendation severity, a recommendation category, and a recommendation description. In some embodiments, the UI includes a user configurable statistics data time period and minimum row count of an object to be included in the collected statistics. Similarly, the UI might include a user configurable hot target object percentage, cold target object percentage, and minimum target object size.

Figure 4:
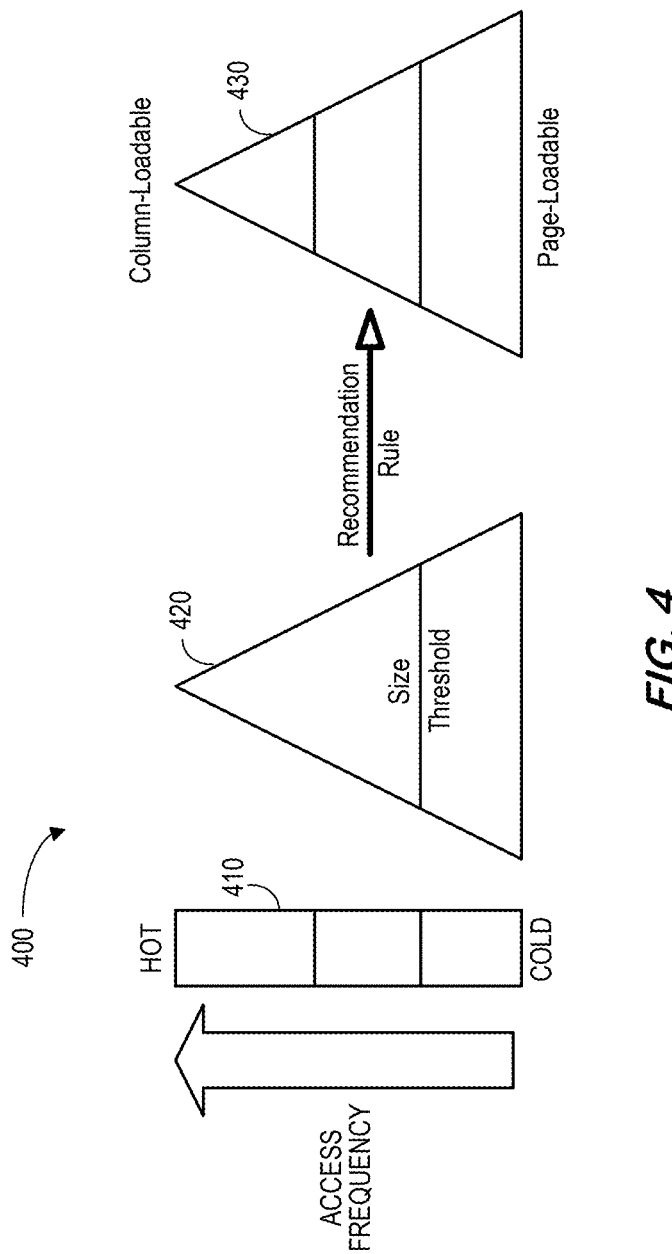
FIG. 4 is a configuration advisor algorithm in accordance with some embodiments.

In this way, the configuration advisor may suggest an appropriate storage approach to a developer. For example, FIG. 4 is a configuration advisor algorithm 400 in accordance with some embodiments. Data access frequency may be collected at a query level to indicate a level of data hotness 410 (e.g., from "cold" to "hot"). A size threshold 420 (e.g., a user adjustable threshold) and recommendation rule may then assign 430 objects as being either page-loadable (more common) or column-loadable (less common, because it is both faster more expensive) as appropriate. For example, rule-based heuristics may identify hot or cold objects (e.g., columns, partitions, and tables) with a large memory footprint as being either column or page loadable candidates. Moreover, a UI may let customers decide to convert each object from column-loadable to page-loadable (or vice versa). Moreover, the recommendations may be based on and/or triggered by customer configurable parameters. The recommendations may be based on statistics captured over a period of time and/or be generated in an asynchronous way.

Figure 5:
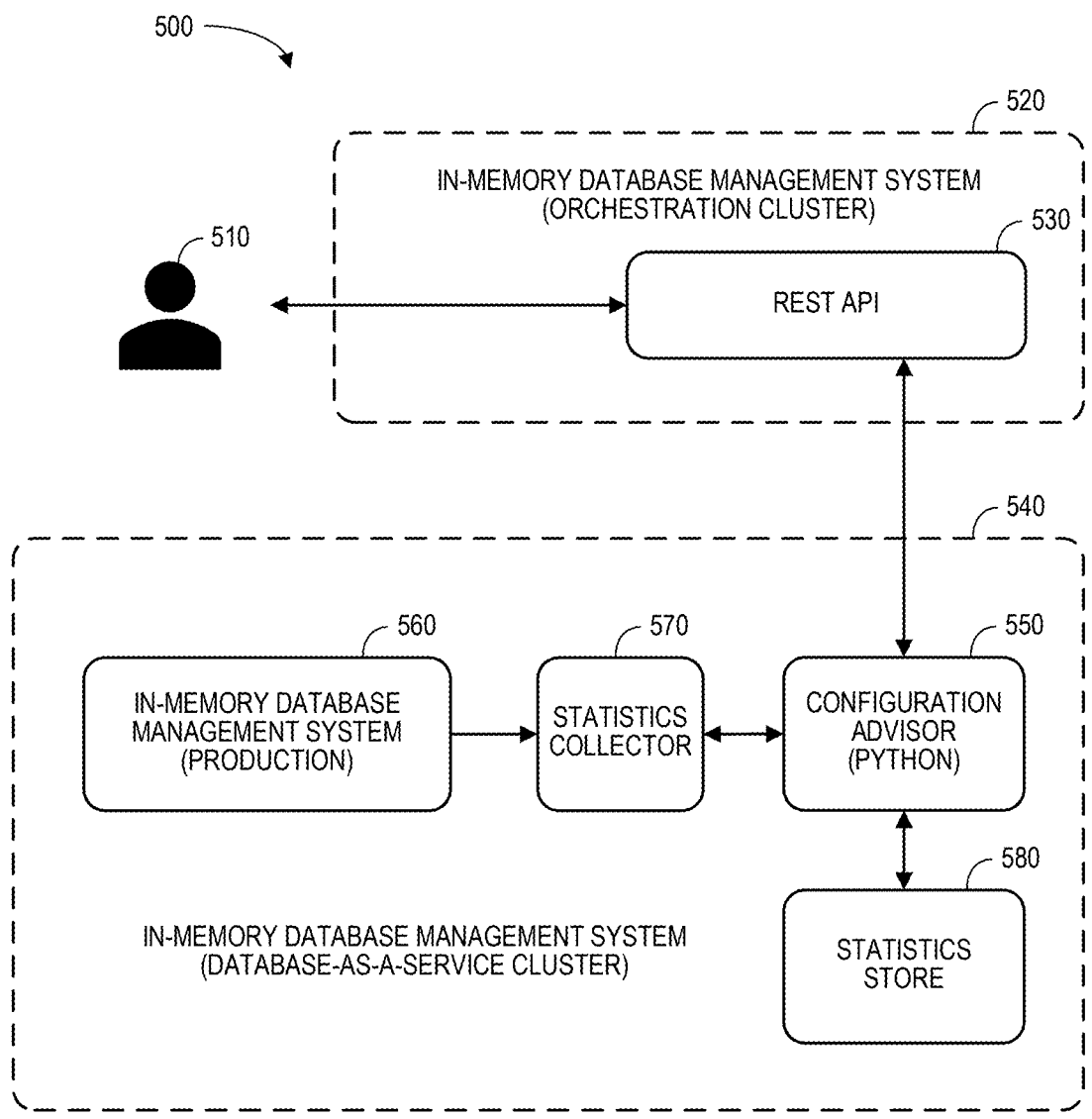
FIG. 5 is a configuration advisor system according to some embodiments.

FIG. 5 is a configuration advisor system 500 according to some embodiments. A developer 510 may access a configuration advisor 550 of a Database-as-a-Service ("DBaaS") cluster 540 via Representational State Transfer ("REST") Application Programming Interface ("API") 530 of an orchestration cluster 520. Such an interface from a Software Query Language ("SQL") to the REST API 530 is a relatively cloud-native approach. A statistics collector 570 monitors an in-memory database management system 560 and the results may be stored in a statistics store 580 by the configuration advisor 550. Such an approach keeps statistics collection outside of the in-memory database management system 560 and the configuration advisor may 550 be safer and more robust (e.g., it will not crash the index server, it can be written in Python instead of C++, etc.). Moreover, a microservice architecture may serve multiple database instances with improved flexibility and extensibility (e.g., an independent release cycle). In addition, the system 500 may provide for easier tooling integration (e.g., avoiding a Communication Platform-as-a-Service ("CPaaS") implementation) and allow for scheduling functionality as periodic runs.

Figure 6:
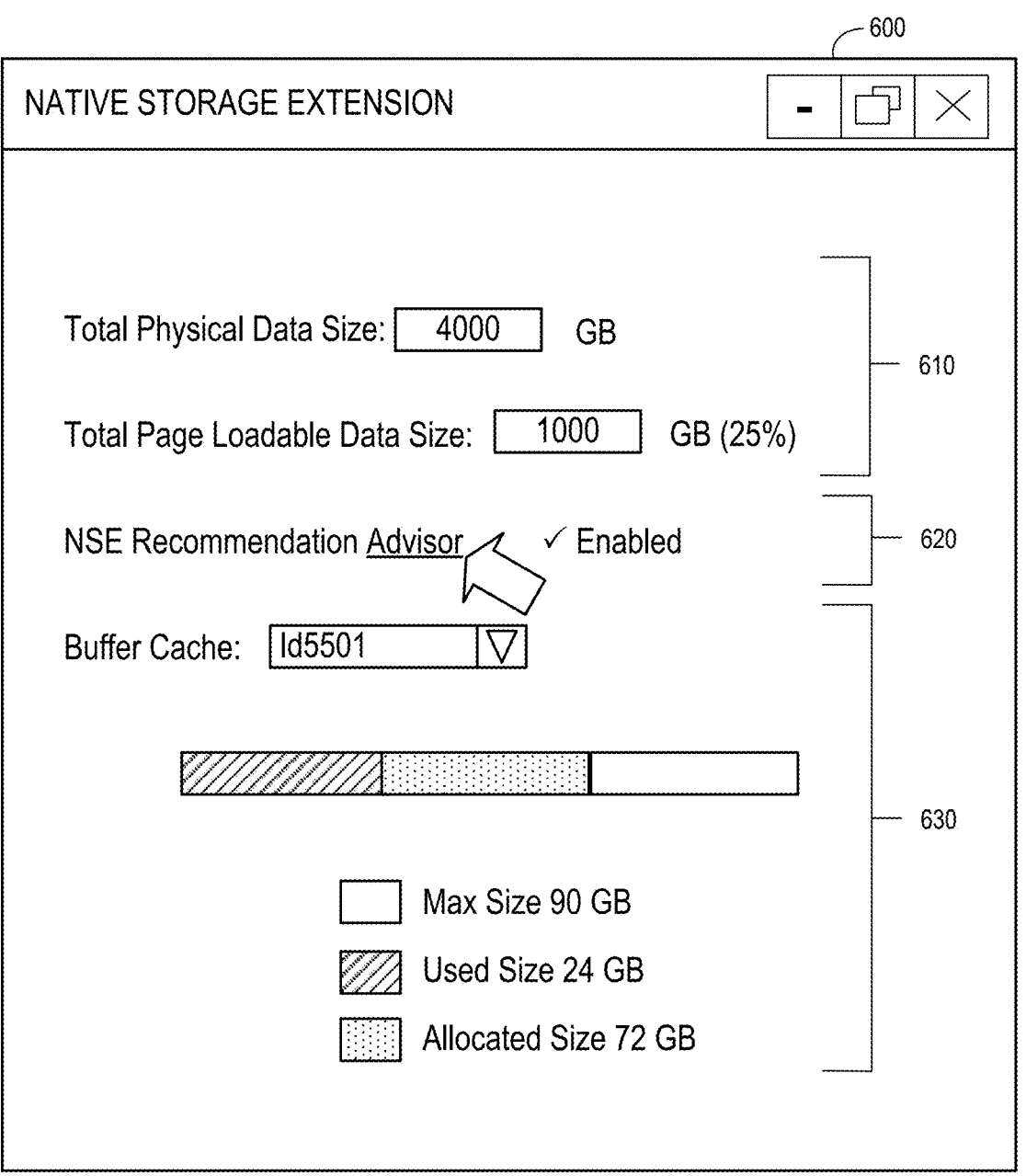
FIG. 6 is an NSE user interface in accordance with some embodiments.
Figure 7:
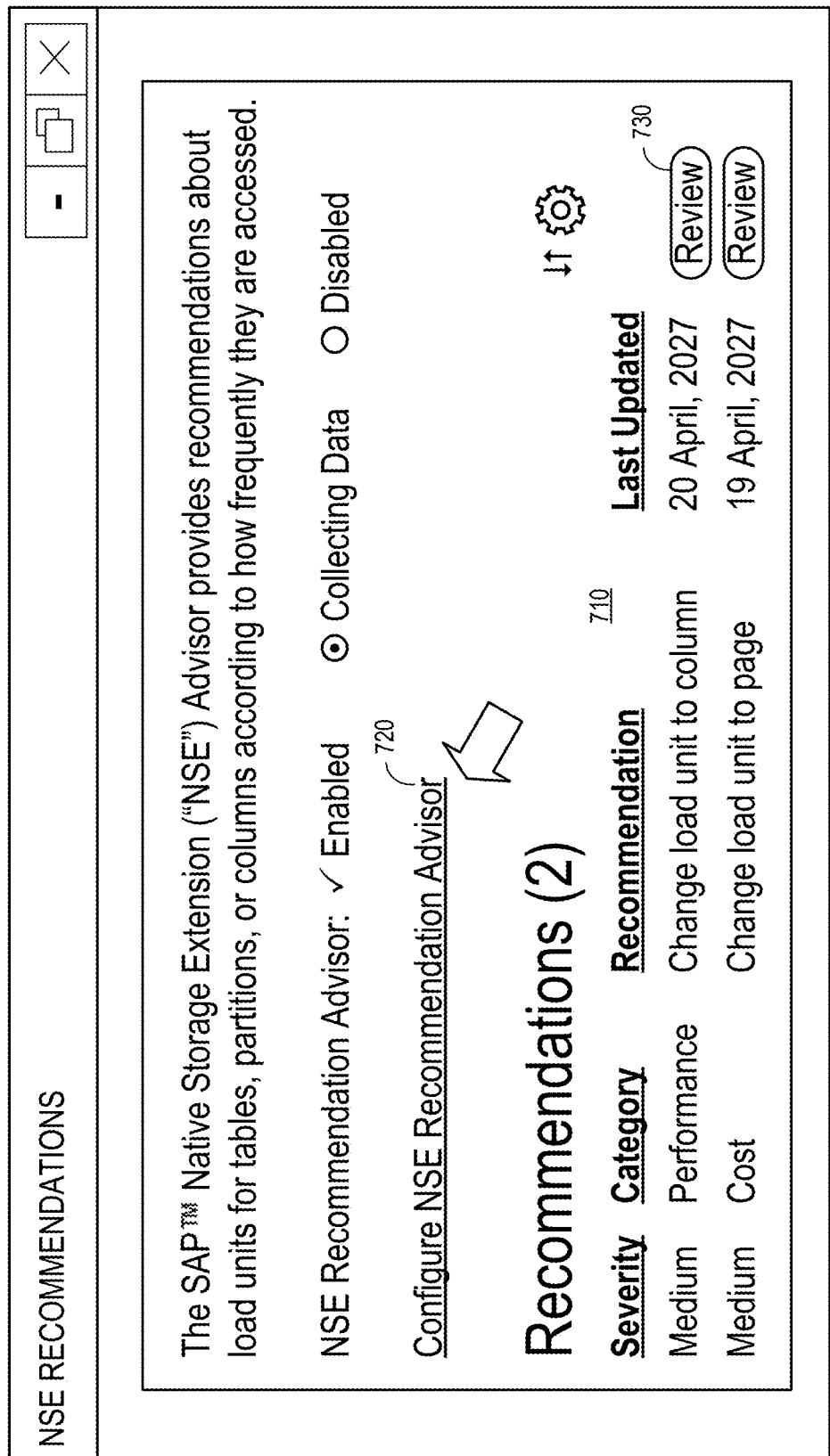
FIG. 7 is an NSE recommendation interface according to some embodiments.

FIG. 6 is an NSE user interface 600 in accordance with some embodiments. The interface 600 includes information about NSE data sizes 610 (e.g., a total physical data size, a total page loadable size, etc.) and an NSE recommendation advisor link 620. The interface 600 may further include buffer cache information 630, including a buffer cache identifier, a maximum size (e.g., in GB), a used size, an allocated size, etc. Selection of the NSE recommendation advisor link 620 may result in a display such as the FIG. 7 recommendation interface 700 according to some embodiments. The interface 700 includes a number of recommendations 710, including a recommendation severity, category, description, update date and time, etc.

Figure 8:
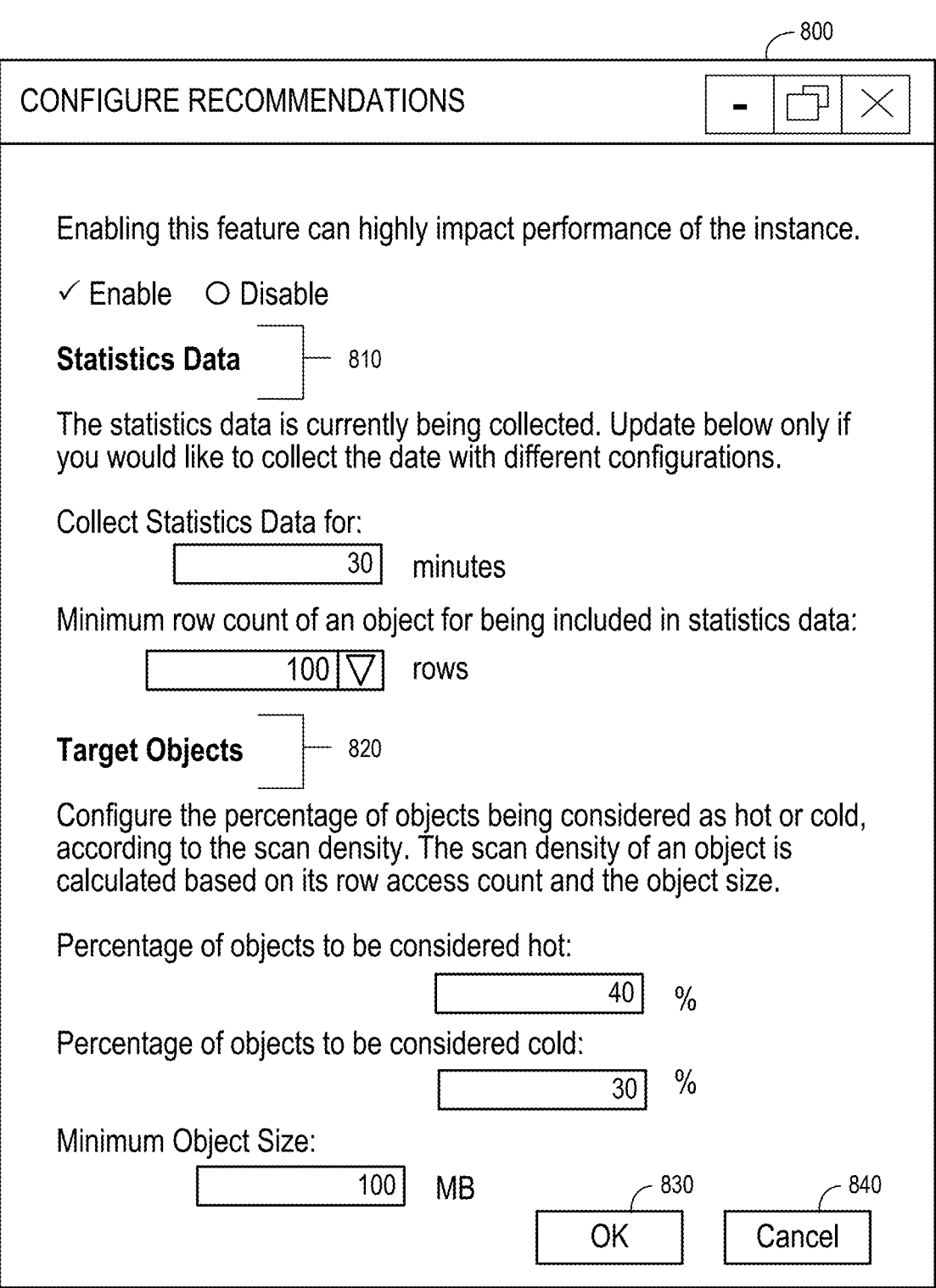
FIG. 8 is an NSE configuration interface in accordance with some embodiments.

Selection of a "Configure NSE Recommendation Advisor" link 720 may result in a display such as the FIG. 8 NSE configuration interface 800 in accordance with some embodiments. The interface lets a developer enable (or disable) the feature and include statistics data 810, such as how long the system should collect statistics data, a minimum row count of an objection for inclusion in statistics data, etc. The interface further includes information about target objects 820, such as a percentage of objects to be considered hot, a percentage of objects to be considered cold, a minimum object size, etc. Selection of an "OK" icon 830 may apply the recommendation while selection of a "Cancel" icon 840 may reject the changes.

Referring again to FIG. 7, selection of a "Review" icon 730 may result in a display such as the FIG. 9 NSE configuration review interface 900 according to some embodiments. The interface lets a developer search for recommended actions and review individual recommendations 910, including a schema identifier, a table name, a partition name, a column name, a main physical size, an effective unit, a status, etc. Selection of an "Apply" icon 920 may result in the system making the suggested changes.

Figure 10:
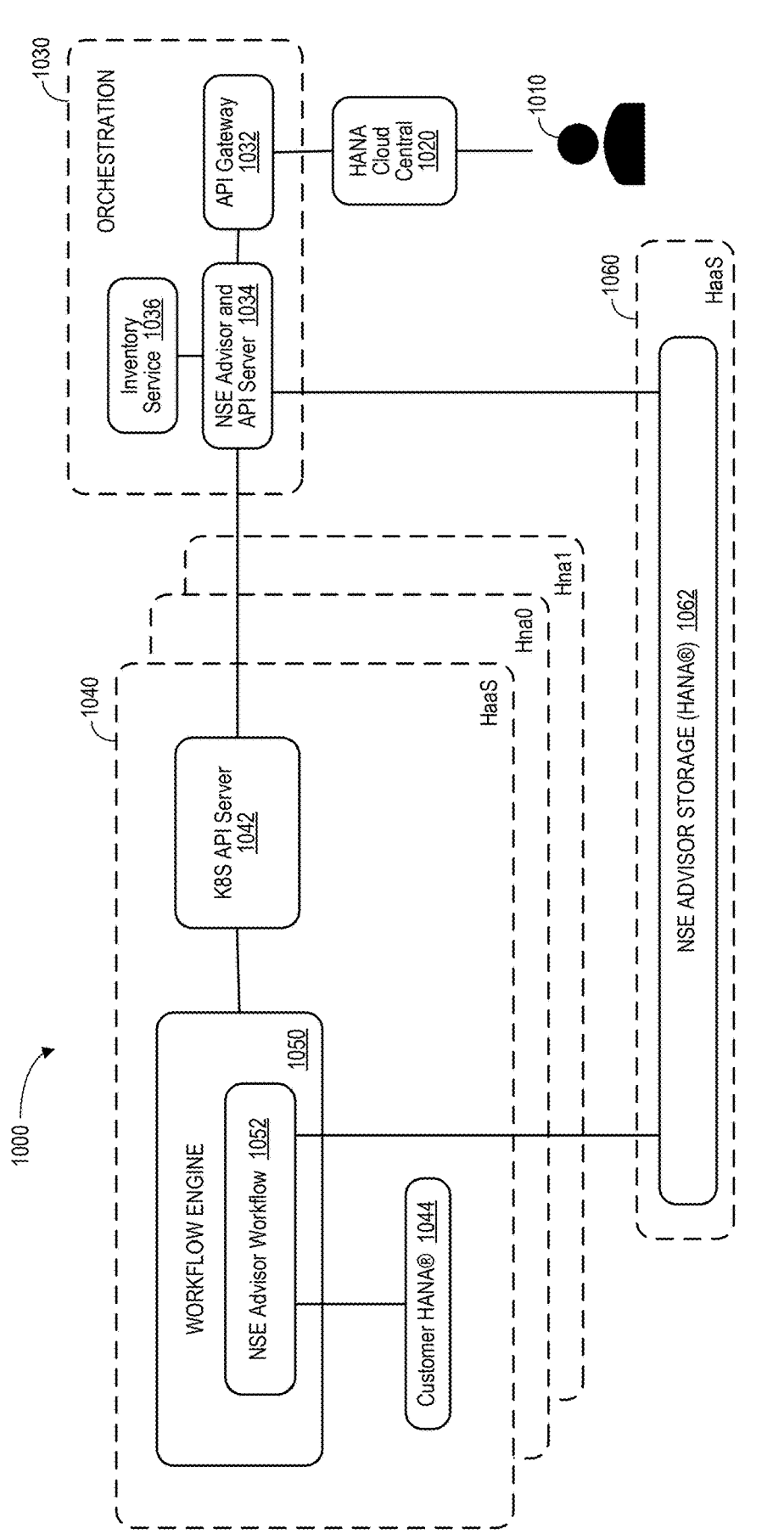
FIG. 10 is a more detailed NSE system architecture in accordance with some embodiments.

FIG. 10 is a more detailed NSE system 1000 architecture in accordance with some embodiments. A developer 1010 may communicate with an API gateway 1032 in an orchestration 1030 via a HANA® cloud central 1020. The developer 1010 may, for example, send configuration parameters to and/or receive recommendations from an NSE advisor and API server 1034. The NSE advisor and API server 1034 may access an inventory service 1036 and exchange information with, for example, a Kubernetes API server 1042 of a HANA-as-a-Service ("HaaS") instance in a cloud landscape 1040. Note that the cloud landscape 1040 may contain multiple instances (e.g., thousands of instances) and may be deployed in connection with microservices.

An NSE advisor workflow 1052 executing in a workflow engine 1050 of the cloud landscape 1040, such as an ARGO workflow open source container-native engine for orchestrating parallel jobs on Kubernetes may exchange information with a customer HANA® 1044 (e.g., to collect data access statistics). According to some embodiments, NSE advisor storage in HANA® 1062 (also executing as a HaaS 1060) may store the statistics and provide information to the NSE advisor and API server 1034 (e.g., recommendations to be sent to the developer 1010).

Figure 11:
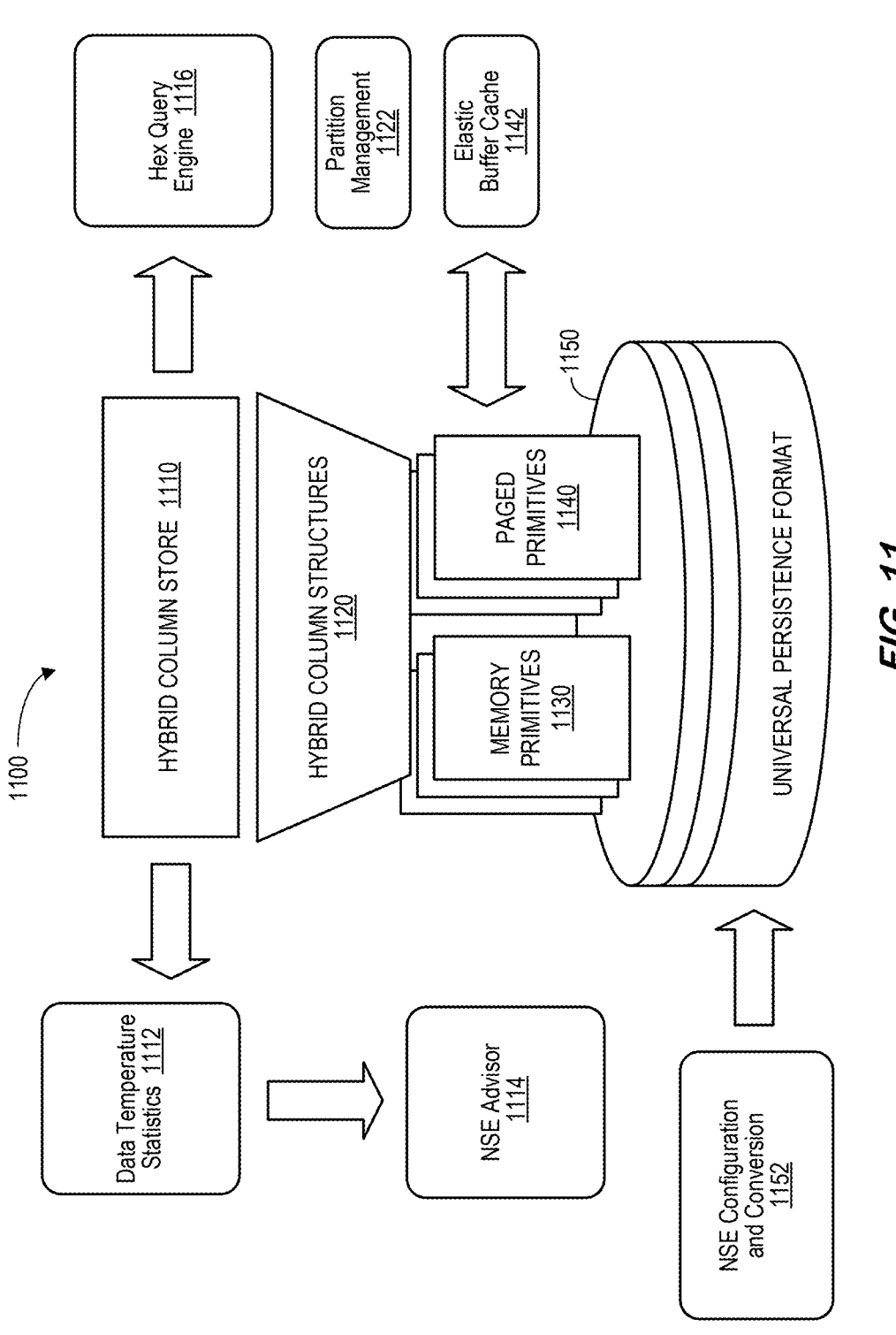
FIG. 11 is a more detailed NSE advisor system according to some embodiments.

FIG. 11 is a more detailed NSE advisor system 1100 according to some embodiments. A hybrid column store 1110 may be associated with specialized attribute implementations, such as uncompressed, compressed, spatial, RowID, HashKey, etc. the hybrid column store 1110 may send data temperature statistics 1112 (e.g., about "hot" and "cold" records data access patterns and frequency) to be used by an NSE advisor 1114 heuristics-based page-ability recommendation tool. The hybrid column store 1110 may also provide information to a hex query engine 1116 that supports hybrid column store features, including pre-fetch.

Hybrid column structures 1120 may be associated with a dictionary, data vectors, indexes, etc., and may be loaded in-memory or paged. According to some embodiments, partition management 1122 may enable flexible data partitioning and support data partitioning and/or aging with NSE. The hybrid column structures 1120 may interface with memory primitives 1130, such as vectors, n-bit compliment vectors, bit vectors, custom memory block structures, etc. the hybrid column structures 1120 may also interface with paged primitives 1140, such as paged vectors, paged n-bit vectors, paged bit vectors, generic on-page block storage, etc. and communicate with an elastic buffer cache 1142 that manages a paged memory pool replacement policy and pre-fetch for page-loaded structures. The memory primitives 1130 and paged primitives 1140 may be stored in a universal persistence format 1150 that is compatible with the memory primitives 1130 and paged primitives 1140. According to some embodiments, the universal persistence format 1150 may also receive information from an NSE configuration and conversion Data Definition Language ("DDL") 1152 that lets user to specify paging eligibility for tables, partitions, and columns. The NSE configuration and conversion DDL 1152 may, for example, provide efficient, non-blocking conversion from existing storage to the NSE format.

Figure 12:
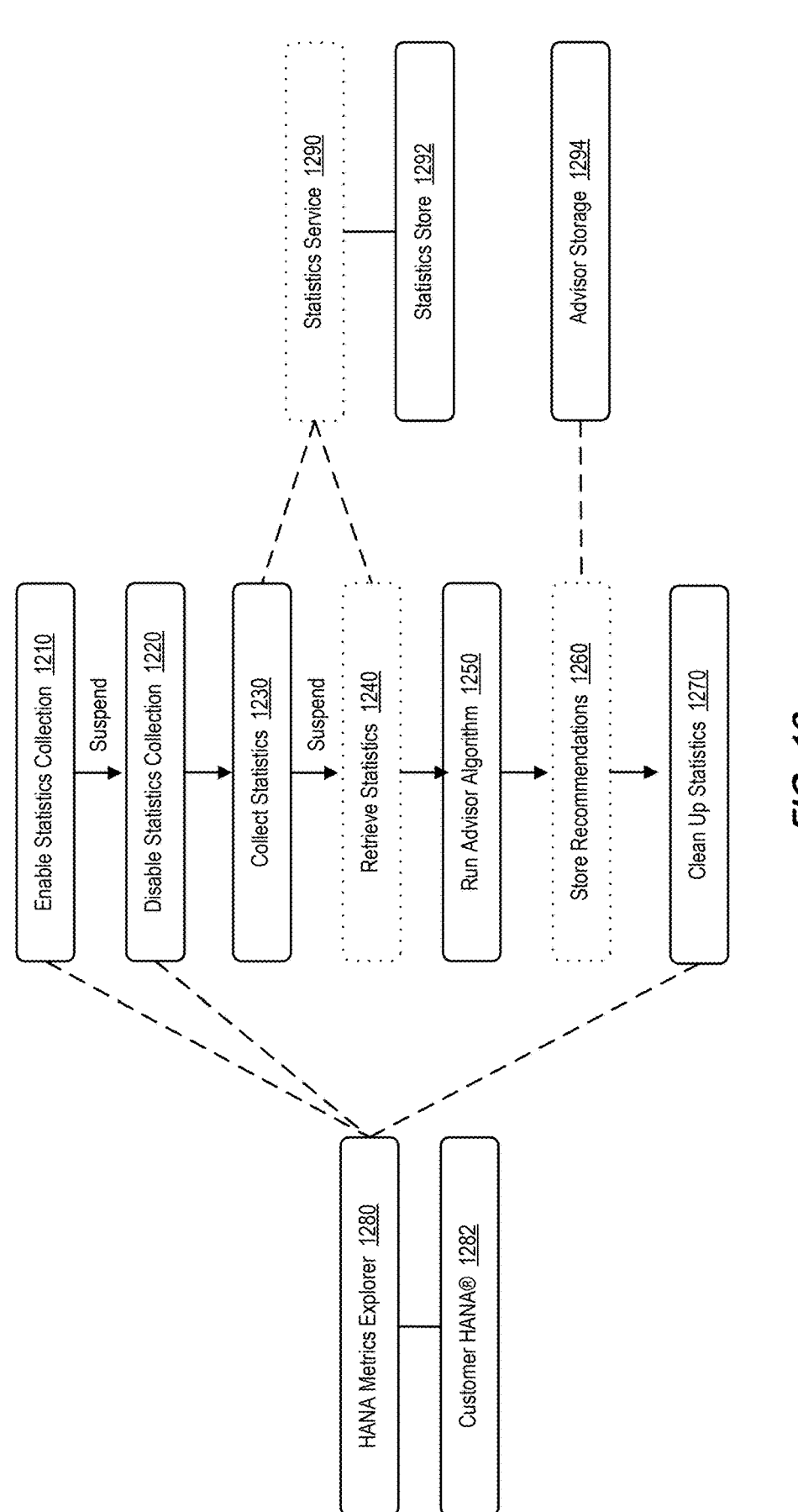
FIG. 12 is an NSE workflow in accordance with some embodiments.

FIG. 12 is an NSE workflow in accordance with some embodiments. The workflow begins by enabling statistics collection 1210 (e.g., in response to a trigger event). If suspended (e.g., after a predetermined period of time), the statistics collection may be disabled 1220. The statistics may then be collected 1230 and retrieved 1240 for use by an advisor algorithm 1250. The recommendations may then be stored 1260 and the statistics can be cleaned up 1270 if not longer needed. According to some embodiments, a HANA® metrics exporter 1280 working with a customer HANA® 1282 may help control statistics enablement 1210, disablement 1220, and/or clean up 1270. In some cases, a HANA® cloud statistics service 1290 and statistics store 1292 may control statistics collection 1230 and retrieval 1240. Moreover, advisor storage 1294 may be associated with the storage of recommendations 1260.

Figure 13:
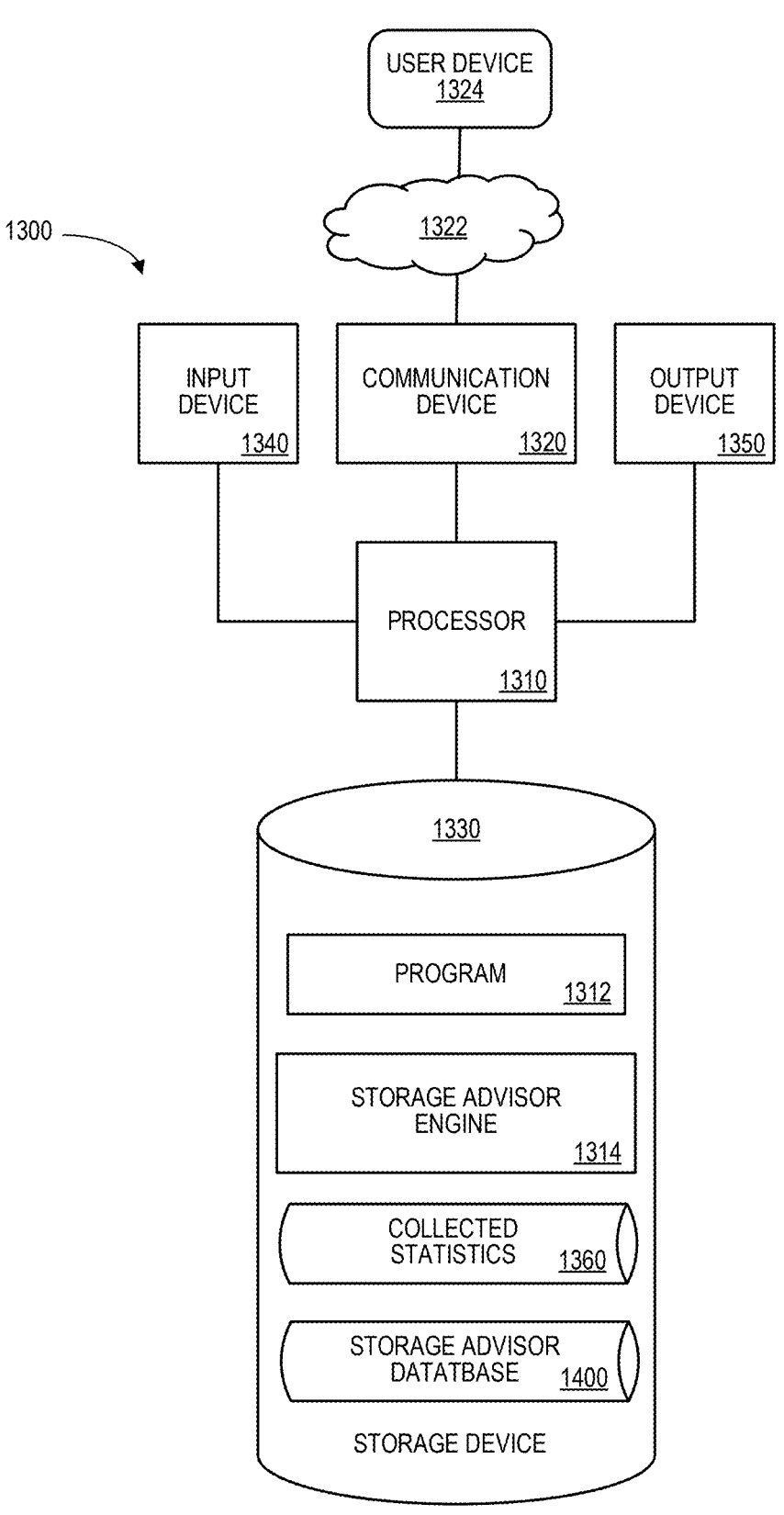
FIG. 13 is an apparatus in accordance with some embodiments.

Note that the embodiments described herein may be implemented using any number of different hardware configurations. For example, FIG. 13 is a block diagram of an apparatus or platform 1300 that may be, for example, associated with the system 200 of FIG. 2 (and/or any other system described herein). The platform 1300 comprises a processor 1310, such as one or more commercially available CPUs in the form of one-chip microprocessors, coupled to a communication device 1320 configured to communicate via a communication network (not shown in FIG. 13). The communication device 1320 may be used to communicate, for example, with one or more user devices 1324 via a distributed communication network 1322. The platform 1300 further includes an input device 1340 (e.g., a computer mouse and/or keyboard to input data about configuration parameters) and an output device 1350 (e.g., a computer monitor to render a display, transmit recommendations or alerts, and/or create data storage reports). According to some embodiments, an operator or administrator mobile device and/or PC may also be used to exchange data with the platform 1300.

The processor 1310 also communicates with a storage device 1330. The storage device 1330 can be implemented as a single database, or the different components of the storage device 1330 can be distributed using multiple databases (that is, different deployment data storage options are possible). The storage device 1330 may comprise any appropriate data storage device, including combinations of magnetic storage devices (e.g., a hard disk drive), optical storage devices, mobile telephones, and/or semiconductor memory devices. The storage device 1330 stores a program 1312 and/or storage advisor engine 1314 for controlling the processor 1310. The processor 1310 performs instructions of the programs 1312, 1314, and thereby operates in accordance with any of the embodiments described herein. For example, the processor 1310 may retrieve statistics about information accessed via an in-memory database management system. Based on the retrieved statistics, the processor 1310 may automatically generate a data storage recommendation for the in-memory database management system. The data storage recommendation may be, for example, associated with page-loadable or column-loadable units and a persistence memory layer. According to some embodiments, the data storage recommendation may be further based on a storage cost, a performance metric, an access frequency, an object threshold (e.g., a threshold for a data column, a data partition, or a data table), recommendation rule-based heuristics, etc.

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, data may be "received" by or "transmitted" to, for example: (i) the platform 1300 from another device; or (ii) a software application or module within the platform 1300 from another software application, module, or any other source.

In some embodiments (such as the one shown in FIG. 13), the storage device 1330 further stores collected statistics 1360 and a storage advisor database 1400. An example of a database that may be used in connection with the platform 1300 will now be described in detail with respect to FIG. 14. Note that the database described herein is only one example, and additional and/or different data may be stored therein. Moreover, various databases or data stores may be split or combined in accordance with any of the embodiments described herein.

Referring to FIG. 14, a table is shown that represents the storage advisor database 1400 that may be stored at the platform 1300 according to some embodiments. The storage advisor database 1400 may include, for example, entries identifying recommendations for a database management system. The storage advisor database 1400 may also define fields 1402, 1404, 1406, 1408 for each of the entries. The fields 1402, 1404, 1406, 1408 may, according to some embodiments, specify: a database management system identifier 1402, configuration parameters 1404, recommendation details 1406, and a recommendation 1408. The storage advisor database 1400 may be created and updated, for example, when a new database management system is analyzed, new configuration parameters are received from a developer, statistics are collected, etc.

The database management system identifier 1402 may comprise, for example, a unique alphanumeric label or link that is associated with a database management system being analyzed. The configuration parameters 1404 might be associated with storage sizes, a buffer cache, statistics data (e.g., a collection period of time), target objects (e.g., hot and cold percentages), etc. The recommendation details 1406 might indicate a severity, a recommendation category, a recommendation date, etc. The recommendation 1408 might indicate that a system is already optimized, whether a load unit should be switched between column and page, etc.

Figure 15:
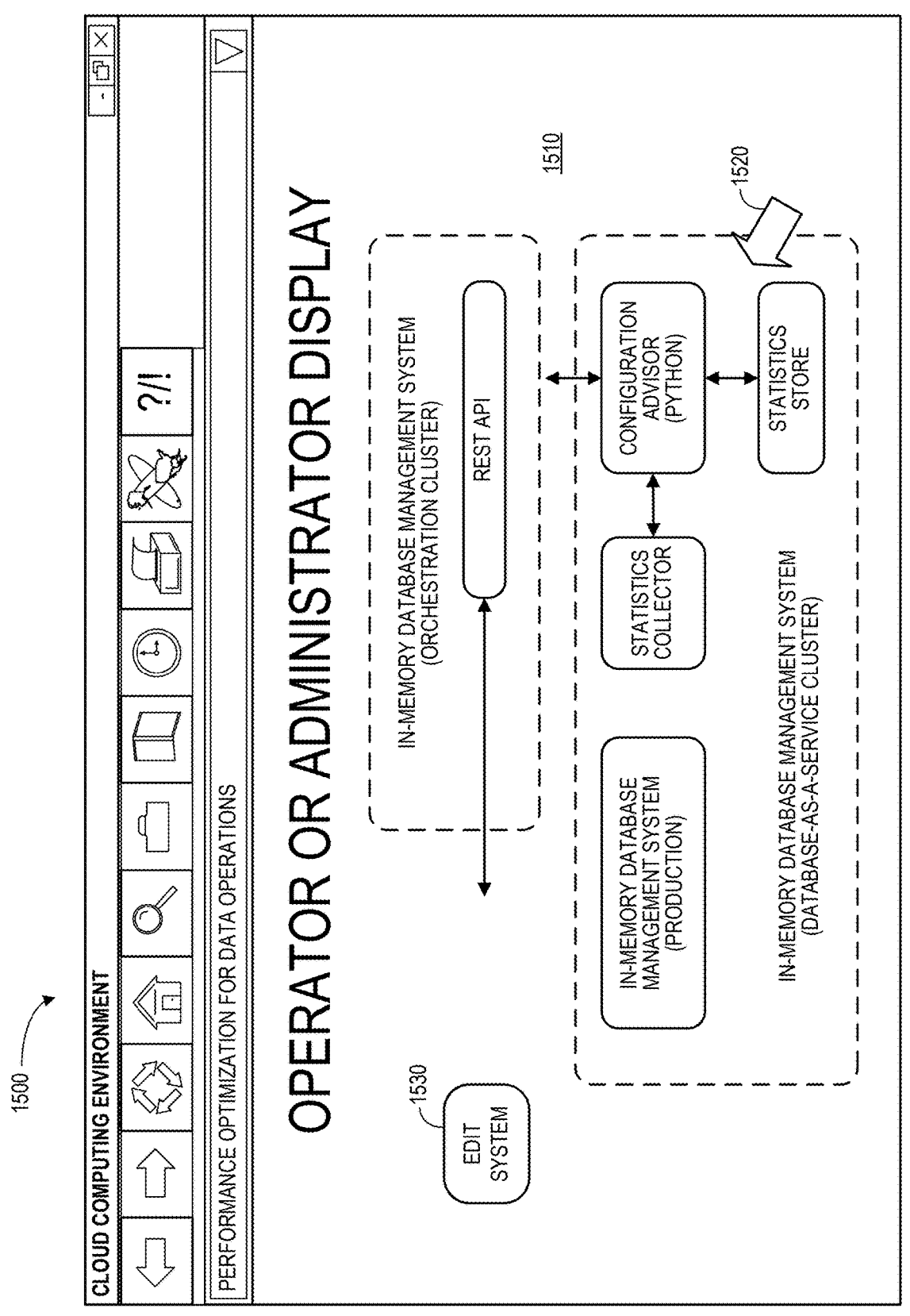
FIG. 15 is an example of an operator or administrator display according to some embodiments.

FIG. 15 is an example of an operator or administrator display according to some embodiments. The display 1500 includes a graphical representation 1510 or dashboard that might be used to manage or monitor in-memory database storage optimization (e.g., by analyzing collected data access statistics). In particular, selection of an element (e.g., via a touchscreen or computer mouse pointer 1520) might result in the display of a popup window that contains configuration data. The display 1500 may also include a user selectable "Edit System" icon 1530 to request system changes (e.g., to investigate or improve recommendation rules or logic, to change a data source or destination mapping parameter, etc.).

Thus, embodiments may provide systems and methods to help efficiently improve the performance and cost of various types of data storage and data operations in a cloud environment. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications with modifications and alterations limited only by the spirit and scope of the appended claims.

Figure 16:
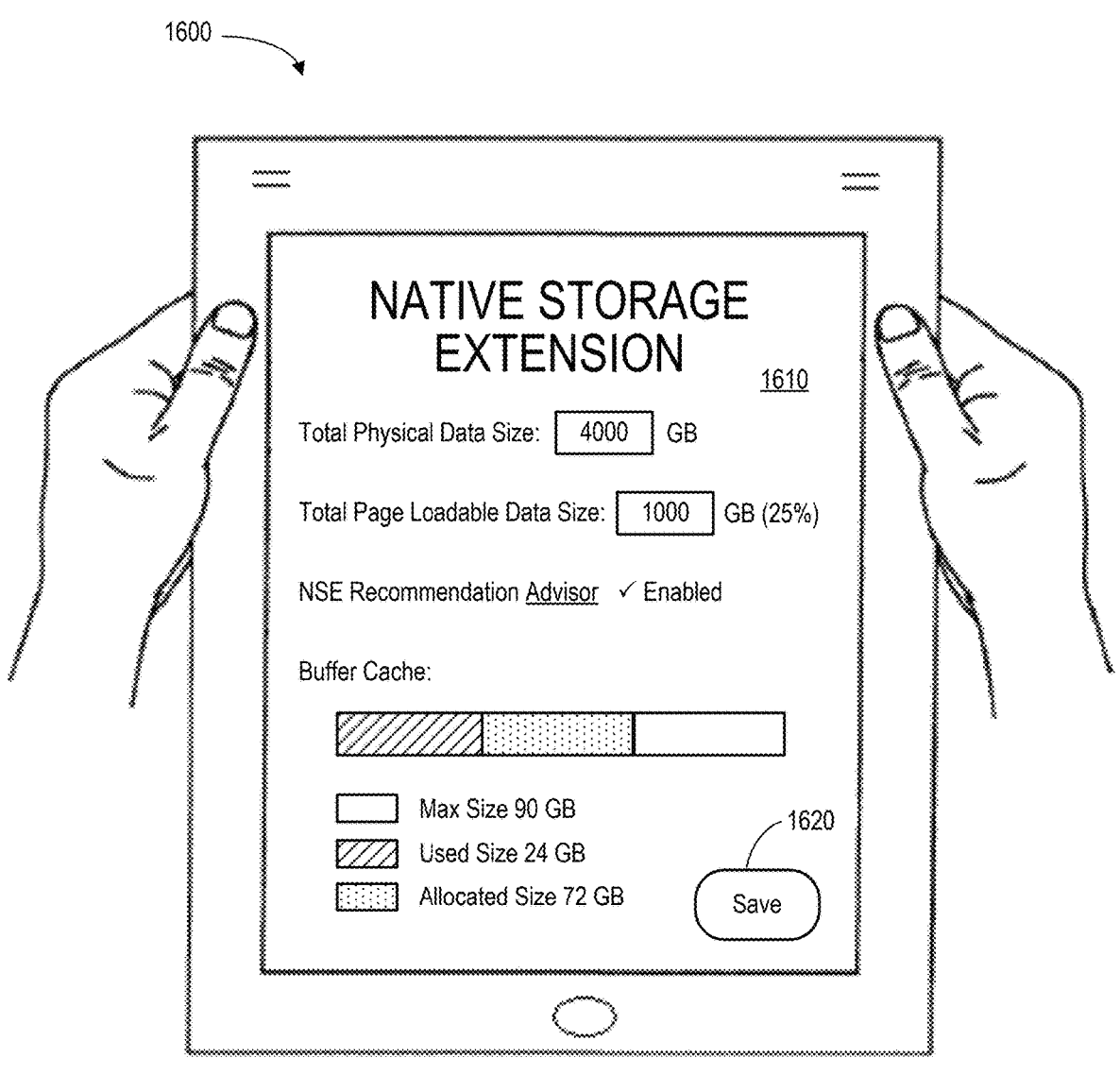
FIG. 16 is a tablet computer showing an NSE display in accordance with some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of data operations, any of the embodiments described herein could be applied to other types of data operation. Moreover, the displays shown herein are provided only as examples, and any other type of user interface could be implemented. For example, FIG. 16 shows a handheld tablet computer 1600 rendering an NSE display 1610 that may be used to help a user establish configuration advisor parameters (e.g., setting data sizes via a "Save" icon 1620).

What is claimed is:

1. A system, comprising:

a collected statistics data store containing statistics about information accessed via an in-memory database management system executing in a cloud computing environment;

a configuration advisor executing in the cloud computing environment and coupled to the collected statistics data store, including:

a computer processor, and a computer memory coupled to the computer processor and storing instructions that, when executed by the computer processor, cause the configuration advisor to:

retrieve the statistics about information accessed via the in-memory database management system, automatically generate a data storage recommendation for the in-memory database management system based on the retrieved statistics and a combination of a specified: storage cost, performance metric, access frequency, data table object threshold, page-loadable or column-loadable units, and persistence memory layer for the in-memory database management system, the recommendation including a combination of a severity of the recommendation, a category of the recommendation, a textual description of the recommendation, and an update date and time for the recommendation; and execute, in response to a received selection of the recommendation, a change to a configuration of the in-memory database management system to implement the recommendation.

2. The system of claim 1, wherein the data storage recommendation is further based on an object threshold and recommendation rule-based heuristics.

3. The system of claim 2, wherein the object threshold is associated with a data column or a data partition.

4. The system of claim 1, wherein the configuration advisor includes a user interface that lets a user convert between column-loadable and page-loadable options on an object-by-object basis.

5. The system of claim 4, wherein the user interface includes a recommendation severity, a recommendation category, and a recommendation description.

6. The system of claim 4, wherein the user interface includes a user configurable statistics data time period and minimum row count of an object to be included in the collected statistics.

7. The system of claim 4, wherein the user interface includes a user configurable hot target object percentage, cold target object percentage, and minimum target object size.

8. A method, comprising:

retrieving, from a collected statistics data store, statistics about information accessed via an in-memory database management system executing in a cloud computing environment;

automatically generating, by a computer processor of a configuration advisor executing in the cloud computing environment, a data storage recommendation for the in-memory database management system based on the retrieved statistics and a combination of a specified: storage cost, performance metric, access frequency, data table object threshold, page-loadable or column-loadable units, and persistence memory layer for the in-memory database management system, the recommendation including a combination of a severity of the recommendation, a category of the recommendation, a textual description of the recommendation, and an update date and time for the recommendation; and execute, in response to a received selection of the recommendation, a change to a configuration of the in-memory database management system to implement the recommendation.

9. The method of claim 8, wherein the data storage recommendation is further based on an object threshold and recommendation rule-based heuristics.

10. The method of claim 9, wherein the object threshold is associated with a data column or a data partition.

11. The method of claim 8, wherein the configuration advisor includes a user interface that lets a user convert between column-loadable and page-loadable options on an object-by-object basis.

12. The method of claim 11, wherein the user interface includes a recommendation severity, a recommendation category, and a recommendation description.

13. The method of claim 11, wherein the user interface includes a user configurable statistics data time period and minimum row count of an object to be included in the collected statistics.

14. The method of claim 11, wherein the user interface includes a user configurable hot target object percentage, cold target object percentage, and minimum target object size.

15. A non-transitory, machine-readable medium comprising instructions thereon that, when executed by a processor, cause the processor to execute operations to perform a method, the method comprising:

retrieving, from a collected statistics data store, statistics about information accessed via an in-memory database management system executing in a cloud computing environment;

automatically generating, by a computer processor of a configuration advisor executing in the cloud computing environment, a data storage recommendation for the in-memory database management system based on the retrieved statistics and a combination of a specified: storage cost, performance metric, access frequency, data table object threshold, page-loadable or column-loadable units, and persistence memory layer for the in-memory database management system, the recommendation including a combination of a severity of the recommendation, a category of the recommendation, a textual description of the recommendation, and an update date and time for the recommendation; and executing, in response to a received selection of the recommendation, a change to a configuration of the in-memory database management system to implement the recommendation.

16. The medium of claim 15, wherein the data storage recommendation is further based on a storage cost, a performance metric, an object threshold and recommendation rule-based heuristics.

17. The medium of claim 16, wherein the object threshold is associated with a data column or a data partition.

18. The medium of claim 15, wherein the configuration advisor includes a user interface that lets a user convert between column-loadable and page-loadable options on an object-by-object basis, wherein the user interface includes a recommendation severity, a recommendation category, and a recommendation description.

19. The medium of claim 18, wherein the user interface includes a user configurable statistics data time period, minimum row count of an object to be included in the collected statistics, hot target object percentage, cold target object percentage, and minimum target object size.

\* \* \* \* \*